July 27, 1926.
A. E. PAIGE
1,594,111
METHOD OF AND MEANS FOR ELECTRIC WELDING
Filed April 15, 1922
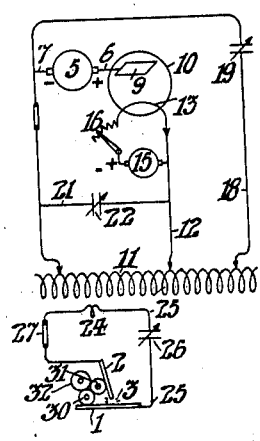
FIG. I.
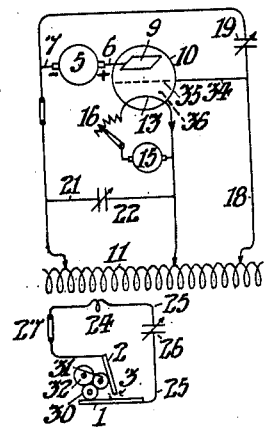
FIG. II.
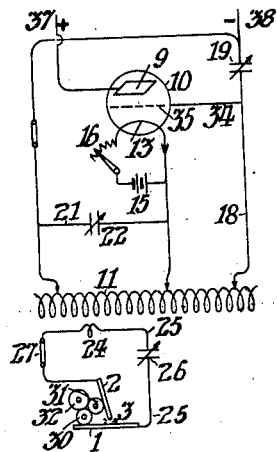
FIG. III.
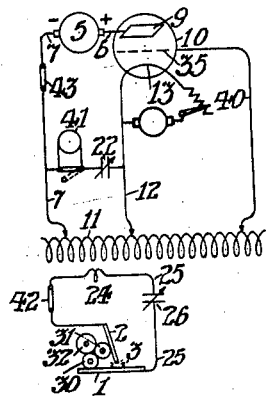
FIG. IV.
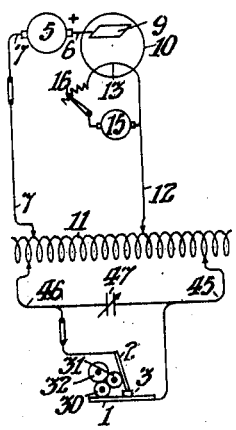
FIG. V.
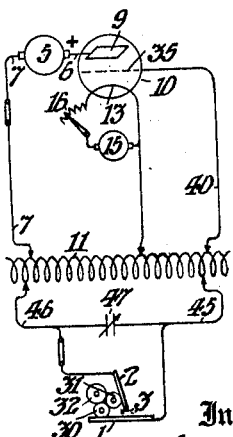
FIG. VI.
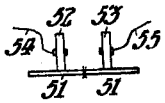
FIG. VII.
Inventor:
Arthur E. Paige Patented July 27, 1926.

1,594,111

UNITED STATES PATENT OFFICE.

ARTHUR E. PAIGE, OF PHILADELPHIA, PENNSYLVANIA.

METHOD OF AND MEANS FOR ELECTRIC WELDING.

Application filed April 15, 1922. Serial No. 552,865.

My invention is particularly applicable to arc welding, by means of a metallic electrode, but is not limited thereto.

Electric arcs are inherently unstable, because increase of current therein is accompanied by decrease of resistance and consumed voltage, and vice versa, decrease of current therein is accompanied by increase of resistance and voltage, and such inverse current and voltage variations are cumulative, so that current may increase and resistance decrease until a short circuit of the source results; or current may decrease and resistance increase until the arc breaks for lack of sustaining voltage. To overcome such inherent instability, an arc circuit must have a drooping volt-ampere characteristic, so that the tendency to increase or decrease of amperage will be immediately compensated and checked by decrease or increase of voltage, respectively, to such value as to maintain constant wattage at the arc.

However, my improved method and means which are adapted for regulating an arc between a metallic electrode from which metal is fused and the article to be welded, hereinafter termed the work, may be advantageously employed in welding apparatus of the resistance type, to maintain constant wattage at the welding region. Such welding region, whether an arc or not, is hereinafter designated the welding gap.

My improved method of welding includes varying the electric permeability of a vacuum in definite relation with variations in resistance at the arc, or welding region; and thereby supplying more or less of electric energy to such arc or region through said vacuum; so as to maintain substantially constant wattage at such arc or region.

As hereinafter described, my improved means for effecting such regulation and stabilization of electric welding circuits include thermionic vacuum tubes of several different types. In its simplest form, such a tube includes two electrodes, in spaced relation, one a filament and the other a plate or other metallic element of greater area than said filament; said filament being connected with a primary circuit, conductively or inductively coupled in such relation with a secondary circuit including the welding gap, that the temperature of said filament tends to vary in correspondence with fluctuations in said gap; so that the flow of electrons between said filament and plate, and the welding energy, are varied by and in accordance with variations in the filament temperature, from a normal value which is adjustably predetermined by the potential of said plate with respect to said filament; but within the saturation current limit of the tube for the corresponding filament temperature or current; there being a definite value of saturation current for each filament temperature. Such a primary circuit may include any suitable source of electric energy with means arranged to adjustably vary the same in accordance with the energy required for a given welding operation.

In a more complex form of my invention, such a vacuum tube is provided with three electrodes, in spaced relation, including such a filament and plate, and a foraminous electrode, hereinafter termed the grid, between said filament and plate, through which the electrons aforesaid must pass; and said grid is included in a circuit with said filament and a source of electric energy, so that by applying positive or negative potential to said grid with respect to the filament, or varying the value of the energy thus applied, or both, it is possible to increase or diminish the flow of electrons between the filament and said plate and tnus adjustably counteract or increase the effect of the space charge in said tube, due to the electrons in the space between the plate and the filament, and thus control the value of the electric energy passing through said plate, without changing the plate potential or filament temperature. That is to say; a negative charge of said grid will repel the electrons emitted by the filament, back toward the latter, and thus decrease the current between said filament and plate, in correspondence with the value of such negative charge; it being possible to thus entirely stop the flow of electrons from the filament to the plate if the grid is sufficiently negative. On the contrary, if the grid is positively charged, the negative space charge due to the electrons in the tube will be partly neutralized and the current through said plate correspondingly increased, while the filament temperature and plate potential may remain constant. So that, the plate current may be thus increased until the saturation current corresponding to the existing filament temperature is reached, by merely increasing the positive potential of said grid. The principal advantage of the latter method of control is that the energy required to charge the grid to the desired potential is extremely small, due to the small capacitance of the grid with respect to the filament, whereas the energy transmitted through the plate to the gap may be of large value.

It is the object and effect of my invention to derive from direct current source of electric energy, alternating current adjustably variable and automatically regulated, as to frequency, potential and other characteristics, so as to be effective for welding, as hereinafter described. However, apparatus described in the appended claims may not only be used for welding, but for other purposes, and my improved means for producing a magnetic field involving the vacuum chamber through which electric energy is conducted, as hereinafter described, may be used for any purpose; for instance, for radio transmission and reception, detection and amplification.

My invention includes the various novel features of construction, arrangement and procedure hereinafter more definitely specified. However, certain specific features of construction, arrangement and procedure herein disclosed are broadly claimed in my copending application Serial No. 548,299, for Letters Patent of the United States.

In said drawings; Fig. I is a wiring diagram showing an embodiment of my invention including a vacuum tube with but two electrodes and energized by direct current, from both a main source and an auxiliary source, but affording oscillatory current at the welding gap; the frequency of oscillation at said gap being variably determinable by adjustment of a condenser. Fig. II is a wiring diagram showing an embodiment of my invention similar to Fig. I, but including a vacuum tube with three electrodes. Fig. III is a wiring diagram showing an embodiment of my invention similar to Fig. II, but adapted to be energized by connection with a remote main source of direct current. Fig. IV is a wiring diagram showing an embodiment of my invention similar to Fig. II but without the auxiliary source of electric energy for the filament electrode. Fig. V is a wiring diagram showing an embodiment of my invention, including a vacuum tube with but two electrodes; wherein the potential at the welding gap is variably determinable by adjustment of a condenser 47; the frequency of oscillation being otherwise variably determinable. Fig. VI is a wiring diagram showing an embodiment of my invention similar to Fig. IV, but including a vacuum tube with three electrodes. Fig. VII is a fragmentary view of my improved means for electric welding.

Referring to the form of my invention shown in Fig. I; the work to be welded is indicated at 1 and an electrode at 2, with an arc 3 at the gap between them. Alternating current available at said gap is derived from the direct current source 5, which may be a generator equipped with means for adjustably varying the value of the energy which it supplies through the conductors 6 and 7. Said conductor 6 is connected to the plate electrode 9, in the vacuum tube 10, which electrode is thus positively charged. Said conductor 7 is variably connected to the primary induction coil 11, which coil is also variably connected, by the conductor 12, with the filament electrode 13, which is thus negatively charged. Said filament electrode 13 may also be energized by the auxiliary source 15, through the variable rheostat 16, whereby the temperature of said electrode 13 may be precisely controlled. The shunt circuit including the conductor 18 and the variable condenser 19 is arranged to be variably connected to the opposite end of said primary coil 11; so that said condenser 19 is in parallel relation with said vacuum tube 10, and serves to vary the capacitance of said shunt circuit. The shunt circuit including the conductor 21 and variable condenser 22 connects said conductors 7 and 12 in parallel relation with the portion of said primary coil 11 which is used to induce the electric energy in the secondary circuit. The secondary coil 24 is in coupled relation with said primary coil 11, and the relative proportions of said coils 11 and 24 are such as to afford the desired electric energy at the arc 3. Said coil 24 is connected to the work 1 through the conductor 25 and variable condenser 26 and said coil 24 is also connected to the welding electrode 2 through the conductor 27.

In the construction and arrangement shown in Fig. I; the value of the energy transmitted through the vacuum tube 10 is variable by variations of the electric charge and temperature of the filament electrode 13; and the frequency of oscillation of the energy in the circuit is determined by adjustment of said condenser 22. The condenser 26 is adjusted to tune the secondary circuit to the same frequency.

Although said welding electrode 2 may be manually shifted with respect to the work 1; I prefer to provide automatic means to effect the desired relative movement of said electrode with respect to said work at a constant rate. Therefore, I have indicated such mechanism in Fig. I by the two wheels 30 and 31 respectively in engagement with said work 1 and said electrode 2, and have exemplified their cooperative relation by indicating said wheels in contact with each other. However, such feeding mechanism may be of any suitable construction and may be actuated by any suitable means. For instance, such mechanism may be driven by an electric motor 32, either excited with energy from said source 5 or from said source 15, or from an independent source.

The form of my invention shown in Fig. II, includes all of the elements above described with reference to Fig. I, and with the addition of the conductor 34, leading from the conductor 18 to the grid electrode 35. The function and effect of such a grid electrode in the vacuum chamber 36 are above described. However, it may be observed that the operation of my invention shown in Fig. II differs from that shown in Fig. I in that the value of the electric energy transmitted through the vacuum may be modified not only by variations in the charge of electric energy on the filament electrode 13, but also by the charge of electric energy on the grid electrode 35. It is to be understood that the apparatus shown in Fig. II may be adjusted in the manner above described with reference to Fig. I.

The form of my invention shown in Fig. III is similar to that shown in Fig. II except that the main primary source of electric energy is remote from the vacuum tube 10 and connected therewith by the respective conductors 37 and 38; said conductor 37 being directly connected with the plate electrode 9 and said conductor 38 being directly connected with the induction coil 11. Otherwise, it is to be understood that the apparatus shown in Fig. III is operated in the manner above contemplated with reference to Fig. II.

Fig. IV shows a simplified embodiment of my invention wherein the three vacuum tube electrodes 9, 13 and 35 are energized from the same primary source 5 and without the employment of the auxiliary source 15 and the condenser 19. In Fig. IV; said source 5 is directly connected, by the conductor 6, with the plate electrode 9, but is indirectly connected with the filament electrode 13, to energize the latter through the conductor 7, primary induction coil 11 and conductor 12. The grid electrode 35 is directly connected with said primary induction coil 11 by the conductor 40. I find it convenient to include a hot wire ammeter 41 in the shunt circuit with said variable condenser 22 to facilitate the adjustment of the apparatus aforesaid. Such adjustment may be effected by opening the secondary welding circuit, conveniently at the switch 42, and opening the primary circuit, conveniently at the switch 43. The circuit including the condenser 22 and primary induction coil 11 is then tuned to the desired frequency by exciting it with a wave meter suitably set, and varying said condenser 22 or the inductance 11 until resonance is obtained, which is indicated by a minimum reading on said ammeter 41. The wave meter is then removed and the tube 10 energized by closing the switch 43 and the vacuum circuit adjusted for maximum oscillation generation by adjusting the grid-to-plate coupling until a maximum reading is obtained on said ammeter 41. The welding circuit is then closed by said switch 42 and tuned to the primary circuit by varying its inductance or capacitance. It may be observed that in Fig. IV such tuning may be effected by including more or less of the primary induction coil 11 in inductive relation with the secondary induction coil 24. When the resonance conditions are attained, the maximum alternating current will be induced in the welding circuit including the arc 3, by the oscillations in the primary circuit including said coil 11 and condenser 22.

Figs. V and VI show simplified forms of my invention, respectively including a two electrode vacuum tube and a three electrode vacuum tube, but otherwise similar in that the welding gap circuit is rearranged so that the condenser which is adjustable to vary the frequency of oscillations in the primary circuits above described may be omitted, and the frequency be determined by variations in the induction coil connections; the single condenser which is included in the respective arrangements of Figs. V and VI being adjustable to determine the potential of the electric energy available at said gap. Referring to Fig. V; the primary direct current source 5 has the conductors 6 and 7. Said conductor 6 is connected to the plate electrode 9 in the vacuum tube 10, which electrode is thus positively charged. Said conductor 7 is variably connected to the induction coil 11, and said coil 11 is also variably connected, by the conductor 12, with the filament electrode 13, which is thus negatively charged. Said filament electrode 13 may also be energized by the auxiliary source 15, through the variable rheostat 16, whereby the temperature of said electrode 13 may be precisely variably predetermined. In Fig. V; the secondary circuit includes the two conductors 45 and 46 which are respectively variably connected with said induction coil 11; in such relation to the points of connection of said primary conductors 7 and 12, as to afford the desired energy value at the welding gap 3 between the work 1 and the welding electrode 2 with which said conductors 45 and 46 are respectively connected. The variable condenser 47, in Fig. V, is in parallel relation with said gap 3 and may be adjusted to determine the potential available at said gap 3.

Referring particularly to the embodiments of my invention shown in Figs. I and V; it may be observed that the circuit will oscillate continuously only if the direct current internal resistance of the tube 10 is below a certain value. However, such resistance may be varied by adjusting the temperature of filament 13 by means of the rheostat 16. For instance, starting with said filament 13 cold: the resistance of said tube 10 is infinite and there is no plate current and no oscillation generation. However, if the filament temperature is gradually increased by increasing the filament current there will be a gradually increasing plate current with a gradual decrease of the internal plate resistance of the tube and a certain temperature will be reached when oscillation generation will begin in the circuit. Such oscillation is conveniently initiated by interrupting the circuit and the frequence of such oscillation is determined and may be varied by relative adjustment of the resistance 11 and condensers coupled therewith as shown in said figures.

The form of my invention shown in Fig. VI includes, in addition to the elements above described with reference to Fig. V, the grid electrode 35 which is variably connected with said coil 11 by the conductor 40 as in Fig. IV. In the form of my invention shown in Fig. VI; the frequency of the alternations of electric energy in the secondary circuit is determined by the relative adjustment of the conductors 45 and 46 with respect to said coil 11, and the potential is adjustably variable by means of the condenser 47.

It is to be understood that in any of the forms of my invention above described, the electric energy may be directly transmitted to the work to be welded, by suitable contacts, without the production of an arc. For instance, as indicated in Fig. VII, the work to be welded includes two plates 51 which are abutted and respectively energized through rotary terminals 52 and 53 and respectively provided with conductors 54 and 55, which may be included in any of the secondary circuits above described.

Therefore, I do not desire to limit myself to the precise details of construction, arrangement and procedure herein set forth, as it is obvious that various modifications may be made therein without departing from the essential features of my invention, as defined in the appended claims.

I claim:

1. The method of electric welding which consists in supplying with direct current a primary circuit including electrodes in a vacuum; and supplying with alternating energy derived from said primary circuit, a secondary circuit including a welding gap.

2. The method of electric welding which consists in supplying with direct current a primary circuit including electrodes in a vacuum; supplying with alternating energy derived from said primary circuit, a secondary circuit including a welding gap; and varying the coupling of said circuits to variably determine and control the electric energy in said secondary circuit.

3. The method of electric welding which consists in supplying with direct current a primary circuit including electrodes in a vacuum; supplying with alternating energy derived from said primary circuit, a secondary circuit including a welding gap; and varying the coupling and relative capacitance of said circuits to variably determine and control the electric energy in said secondary circuit.

4. The method of electric welding which consists in supplying with direct current a primary circuit including electrodes in a vacuum; producing a field of electric energy involving said vacuum; supplying with alternating energy derived from said primary circuit, a secondary circuit including a welding gap; and varying the coupling and relative capacitance of said circuits to variably determine and control the electric energy in said secondary circuit.

5. The method of electric welding which consists in supplying with direct current a primary circuit including electrodes in a vacuum; causing electric energy to oscillate in said circuit through said vacuum; and supplying a welding gap, in a secondary circuit, with alternating energy derived from said primary circuit.

6. The method of electric welding which consists in supplying with direct current a primary circuit including electrodes in a vacuum; causing electric energy to oscillate in said circuit through said vacuum; supplying a welding gap, in a secondary circuit with alternating energy derived from said primary circuit; and varying the coupling of said circuits to determine and control the electric energy at said gap.

7. The method of electric welding which consists in supplying with direct current a primary circuit including three electrodes in a vacuum; causing electric energy to oscillate in said circuit through said vacuum; supplying a welding gap, in a secondary circuit with alternating energy derived from said primary circuit; and varying the coupling of said circuits to maintain constant wattage at said gap.

8. The method of electric welding which consists in supplying with direct current a primary circuit including three electrodes in a vacuum; causing electric energy to oscillate in said circuit through said vacuum; supplying a welding gap, in a secondary circuit with alternating energy derived from said primary circuit; and varying the coupling and relative capacitance of said circuits to maintain constant wattage at said gap.

9. The method of electric welding which consists in supplying with direct current a primary circuit including three electrodes in a vacuum; causing electric energy to oscillate in said circuit through said vacuum; supplying a welding gap, in a secondary circuit with alternating energy derived from said primary circuit; and varying the coupling and relative capacitance of said circuits to automatically determine and maintain constant wattage at said gap.

10. In means for electric welding, the combination with a direct current source; of a thermionic tube including electrodes in a vacuum; means connecting said electrodes with said source; an induction coil; means including said induction coil in a primary circuit with said electrodes; means including said induction coil in a secondary circuit with a welding gap; and a condenser included in such relation with said circuits, that when said primary circuit is energized with direct current, an alternating current is induced in said secondary circuit and available at said gap.

11. In means for electric welding, the combination with a direct current source; of a thermionic tube including electrodes in a vacuum; means connecting said electrodes with said source; an induction coil; adjustably variable means including said induction coil in a primary circuit with said electrodes; means including said induction coil in a secondary circuit with a welding gap; and a condenser included in such relation with said circuits, that when said primary circuit is energized with direct current, an alternating current is induced in said secondary circuit and available at said gap.

12. In means for electric welding, the combination with a direct current source; of a thermionic tube including three electrodes in a vacuum; means connecting said electrodes with said source; an induction coil; means including said induction coil in a primary circuit with said electrodes; means including said induction coil in a secondary circuit with a welding gap; and a condenser included in such relation with said circuits, so constructed and arranged that when said primary circuit is energized with direct current, an alternating current is induced in said secondary circuit and available at said gap.

13. In means for electric welding, the combination with a direct current source; of a thermionic tube including electrodes in a vacuum; an induction coil; a condenser; means including said induction coil and condenser in a primary circuit with said electrodes; and means including said induction coil in a secondary circuit with a welding gap; whereby, when said primary circuit is energized with direct current, an alternating current is induced in said secondary circuit and available at said gap.

14. In means for electric welding with alternating current, derived from a direct current source; the combination with a thermionic vacuum tube including a filament electrode, a plate electrode and a grid electrode; of a direct current source; means connecting the positive terminal of said source to said plate electrode; means connecting the negative terminal of said source to said grid electrode; means also connecting the negative terminal of said source to said filament electrode; an induction coil; means including said induction coil and tube in a primary circuit between the positive and negative terminals of said source, in parallel relation with said plate and grid electrodes; a condenser; means connecting said condenser in parallel relation with said coil; and a secondary circuit electrically coupled to said coil and including a welding gap.

15. In means for electric welding with alternating current, derived from a direct current source; the combination with a thermionic vacuum tube including a filament electrode, a plate electrode and a grid electrode; of a direct current source; means connecting the positive terminal of said source to said plate electrode; means connecting the negative terminal of said source to said grid electrode; means connecting the negative terminal of said source to said filament electrode, an induction coil; means including said induction coil and tube in a primary circuit between the positive and negative terminals of said source, in parallel relation with said plate and grid electrodes; a condenser; means connecting said condenser in parallel relation with said coil; a secondary circuit electrically coupled to said coil and including a welding gap; and means arranged to vary the electric coupling of said primary and secondary circuits.

16. In means for electric welding with alternating current, derived from a direct current source; the combination with a thermionic vacuum tube including a filament electrode, a plate electrode and a grid electrode; of a direct current source; a condenser; means connecting the positive terminal of said source to said plate electrode; means connecting the negative terminal of said source to said grid electrode, through said condenser; means connecting the negative terminal of said source to said filament electrode; an induction coil; means including said induction coil and tube in a primary circuit between the positive and negative terminals of said source, in parallel relation with said plate and grid electrodes; a second condenser; means connecting said second condenser in parallel relation with said coil; a secondary circuit electrically coupled to said coil and including a welding gap; and means arranged to vary the electric coupling of said primary and secondary circuits.

17. In means for electric welding with alternating current, derived from a direct current source; the combination with a thermionic vacuum tube including a filament electrode, a plate electrode and a grid electrode; of a direct current source; a condenser; means connecting the positive terminal of said source to said plate electrode; means connecting the negative terminal of said source to said grid electrode, through said condenser; means connecting the negative terminal of said source to said filament electrode; an induction coil; means including said induction coil and tube in a primary circuit between the positive and negative terminals of said source, in parallel relation with said plate and grid electrodes; a second condenser; means connecting said second condenser in parallel relation with said coil; a secondary circuit electrically coupled to said coil and including a welding gap; and means arranged to adjustably vary the electric coupling of said primary and secondary circuits.

18. In means for electric welding with alternating current, derived from a direct current source; the combination with a thermionic vacuum tube including a filament electrode, a plate electrode and a grid electrode; of a direct current source; a condenser; means connecting the positive terminal of said source to said plate electrode; means connecting the negative terminal of said source to said grid electrode; through said condenser; means connecting the negative terminal of said source to said filament electrode; an induction coil; means including said induction coil and tube in a primary circuit between the positive and negative terminals of said source, in parallel relation with said plate and grid electrodes; a second condenser; means connecting said second condenser in parallel relation with said coil; a third condenser; a secondary coil; a secondary circuit including the latter coil, said third condenser, and a welding gap; and means arranged to adjustably vary the electric coupling of said primary and secondary circuits.

19. In means for electric welding, the combination with a thermionic vacuum tube including electrodes in a vacuum; of an induction coil; a condenser; means including said electrodes, coil, and condenser in a primary circuit with a source of direct current; said coil and condenser being in parallel relation with said tube; a secondary circuit including a welding gap; and means arranged to electrically couple said circuits.

20. In means for electric welding, the combination with a thermionic vacuum tube including, in a vacuum, a filament electrode, a plate electrode, and a grid electrode between said filament and plate; of an induction coil; a condenser; means including said electrodes, coil, and condenser in a primary circuit with a source of direct current; said coil and condenser being in oscillatory relation with said tube; a secondary circuit in coupled relation with said primary circuit and including a welding gap; and means arranged to vary the electrical coupling of said circuits.

21. In means for electric welding; the combination with a thermionic vacuum tube including electrodes in a vacuum; of an induction coil; a condenser; means including said electrodes, coil, and condenser in a primary circuit with a source of direct current; said coil and condenser being in oscillatory relation with said tube; a secondary circuit including a welding gap; and means arranged to vary the coupling of said circuits, and thereby induce and automatically regulate alternating electric energy in said secondary circuit.

22. In means for electric welding, the combination with a thermionic vacuum tube including, in a vacuum, a filament electrode, a plate electrode, and a grid electrode between said filament and plate; of an induction coil; a condenser; means including said electrodes, coil, and condenser in oscillatory relation in a primary circuit with a source of direct current; a secondary circuit including a welding gap; and means arranged to vary the coupling of said circuits, and thereby adjustably variably induce and automatically regulate alternating electric energy in said secondary circuit.

In testimony whereof, I have hereunto signed my name at Philadelphia, Pennsylvania, this fourteenth day of April, 1922.

ARTHUR E. PAIGE.